United States Patent [19]

Tanaka et al.

[11] Patent Number: 4,474,934
[45] Date of Patent: Oct. 2, 1984

[54] ONE-PACK TYPE THERMOSETTING POLYURETHANE COATING COMPOSITION FROM A BLOCKED ISOCYANATE CONTAINING AN OXADIAZINETRIONE RING

[75] Inventors: Michio Tanaka, Shizuoka; Yoshio Kamatani, Osaka; Koji Nasu, Hyogo, all of Japan

[73] Assignee: Takeda Chemical Industries, Ltd., Osaka, Japan

[21] Appl. No.: 445,097

[22] Filed: Nov. 29, 1982

[30] Foreign Application Priority Data

Dec. 4, 1981 [JP] Japan ................... 56-196077

[51] Int. Cl.³ .............................................. C08G 18/00
[52] U.S. Cl. .......................................... 528/45; 528/73
[58] Field of Search ..................................... 528/45, 73

[56] References Cited

U.S. PATENT DOCUMENTS 3,730,953  5/1973  Naito et al. ......................... 528/45

Primary Examiner—Maurice J. Welsh
Attorney, Agent, or Firm—Antonelli, Terry & Wands

[57] ABSTRACT

Disclosed is a thermosetting polyurethane coating composition of one-pack type which comprises (1) a compound having at least one NCO group blocked with an alcohol, lactam or oxime blocking agent and at least one oxadiazine-2,4,6-trione ring and (2) a polyol having a molecular weight of 400 to 50,000. The composition has good storage stability and provides coating films having no problems such as yellowing and pin-holes and excellent in mechanical properties, chemical resistance and weather resistance.

20 Claims, No Drawings

ONE-PACK TYPE THERMOSETTING POLYURETHANE COATING COMPOSITION FROM A BLOCKED ISOCYANATE CONTAINING AN OXADIAZINETRIONE RING

This invention relates to a novel thermosetting polyurethane coating composition of one-pack type.

It is known that a light stable coating film can be obtained by blocking with phenol an isocyanate component having oxadiazine-2,4,6-trione ring obtained by the reaction of 1,6-hexamethylene diisocyanate with carbon dioxide, mixing this blocked product with a mixture of polypropylene glycol and diethylene glycol and heating and curing the mixture.

However, the blocked polyisocyanates obtained by the reaction with a phenolic blocking agent are not preferred because they liberate phenol upon baking to yield strong odor and moreover they have a toxicity.

The present inventors have studied for a long time the production and uses of an isocyanate component having oxadiazine-2,4,6-trione ring which is obtained by the reaction of a polyisocyanate with carbon dioxide. As a result, they have found that the thus obtained isocyanate components which are blocked with an alcohol, lactam or oxime blocking agent have less strong odor at baking than those blocked with a phenolic blocking agent and are good in storage stability.

Furthermore, it has been found that the baked coating film has no problems such as yellowing and formation of pin-holes and is excellent in mechanical properties, chemical resistance and weather resistance. Thus, this invention has been accomplished.

This invention relates to a one-pack type thermosetting polyurethane coating composition which comprises containing (1) a compound having at least one NCO group blocked with an alcohol, lactam or oxime blocking agent and oxadiazine-2,4,6-trione ring and (2) a polyol.

The compound (1) having at least one NCO group blocked with an alcohol, lactam or oxime blocking agent and oxadiazine-2,4,6-trione ring which is used in this invention is obtained by blocking an isocyanate component having oxadiazine-2,4,6-trione ring and at least one free NCO group with an alcohol, lactam or oxime blocking agent. The isocyanate component can be conveniently prepared by the reaction of an isocyanate with carbon dioxide.

As examples of the isocyanate, there are aliphatic, alicyclic and aromatic-aliphatic polyisocyanates such as tetramethylene diisocyanate, hexamethylene diisocyanate, $\omega,\omega'$-diisocyanatodipropyl ether, 2,6-diisocyanatocaproic acid ester, 1,6,11-triisocyanatoundecane, bis(isocyanatomethyl)cyclohexane, bis(isocyanatoethyl)cyclohexane, 1-isocyanato-3-isocyanatomethyl-3,5,5-trimethylcyclohexane, bis(4-isocyanatocyclohexyl)methane, xylylene diisocyanate, bis(2-isocyanatoethyl)benzene, etc. These polyisocyanates may be used alone or as a mixture thereof. Furthermore, these polyisocyanates may be used as mixtures with monocyanates such as methyl isocyanate, ethyl isocyanate, n-butyl isocyanate, $\omega$-chlorohexyl isocyanate, cyclohexyl isocyanate, cyclohexylmethyl isocyanate, benzyl isocyanate, phenylethyl isocyanate, etc.

The reaction of isocyanate with carbon dioxide is carried out in the presence of a catalyst. As the catalyst, tertiary phosphines, arsenic compounds and hydroquinones may be used and the tertiary phosphines are especially effective. When an isocyanate having oxadiazinetrione ring has been obtained by the reaction of an isocyanate with carbon dioxide, the reaction product may be used, as it is, as the isocyanate component of this invention, but usually various compounds are added thereto for termination of the reaction and stable preservation of the product. Such reaction terminators and stabilizers include alkylating agents, acylating agents, acids, ester derivatives, phenols, peroxides, sulfur, polysulfides, metal sulfides, halogens, etc. Especially, the isocyanate component having oxadiazinetrione ring to which an additive selected from peroxides, sulfur, polysulfides, metal sulfides and halogens is added is preferred because the reaction of oxadiazinetrione ring and isocyanate with hydroxyl group of polyol component smoothly proceeds.

In the preparation of the isocyanate component having oxadiazinetrione ring from polyisocyanate and carbon dioxide, adducts having terminal NCO group may also be used as the polyisocyanate. Such adducts can be obtained by reacting polyisocyanates with polyol compounds (e.g., ethylene glycol, propylene glycol, 1,4-butanediol, glycerine, trimethylolpropane, polyether polyol, polyester polyol, acrylic polyol, epoxy polyol, etc.) or polyamine compound (e.g., ethylenediamine, hexamethylenediamine, phenylenediamine, polyether polyamine, polyamide polyamine, etc.) in an excess ratio of NCO group to active hydrogen of the polyol or polyamine compounds. Polyisocyanates, NCO of which is partially blocked with a blocking agent and those having partially dimerized or trimerized NCO groups may also be used as the polyisocyanates.

Of the isocyanate components enumerated above, those which are derived from hexamethylene diisocyanate, xylylene diisocyanate or bis(isocyanatomethyl)cyclohexane, especially from the last one provide compositions especially excellent in properties of coating films and curability.

When said isocyanate component contains unreacted isocyanate monomers, low functional substances, etc. and, therefore, is unsuitable to use as it is, it is also possible to remove the monomers, and low functional substances by appropriate methods such as distillation, extraction, crystallization, etc.

Said isocyanate component has one or two or more, preferably 1 to 5 oxadiazinetrione rings and at least one free NCO group.

As the blocking agents used to block said isocyanate components, alcohol, lactam or oxime blocking agents are used among the blocking agents known to be used for blocking organopolyisocyanates.

Examples of these blocking agents are as follows: alcohol blocking agents: methanol, ethanol, n-propyl alcohol, isopropyl alcohol, n-butyl alcohol, isobutyl alcohol, t-butyl alcohol, n-amyl alcohol, t-amyl alcohol, lauryl alcohol, benzyl alcohol, ethylene glycol, monomethyl ether, ethylene glycol monoethyl ether, ethylene glycol monobutyl ether, diethylene glycol monomethyl ether, diethylene glycol monoethyl ether, propylene glycol monomethyl ether, methoxy methanol, glycolic acid, glycolates such as methyl glycolate, ethyl glycolate, butyl glycolate, etc., lactic acid, lactates such as methyl lactate, ethyl lactate, butyl lactate, etc., methylolurea, methylolmelamine, diacetone alcohol, ethylene chlorohydrin, ethylene bromohydrin, 1,3-dichloro-2-propanol, $\omega$-hydroperfluoroalcohol, acetocyanohydrin, etc.

When an isocyanate compound containing two or more oxadiazinetrione rings in one molecule is used as the isocyanate component, polyether, polyester, epoxy or modified epoxy or urethane monoalcohols may also be used besides the above enumerated alcohol blocking agents.

Lactam blocking agents: ε-caprolactam, δ-valerolactam, γ-butyrolactam, β-propiolactam, etc.

Oxime blocking agents: formamidoxime, acetoaldoxime, acetoxime, methyl ethyl ketoxime, diacetylmonoxime, benzophenonoxime, cyclohexanonoxime, etc.

Of the above blocking agents especially the oxime blocking agents have low dissociation temperature and are preferred. The blocking reaction is carried out by the known method in a solvent having no active hydrogen or without solvents. The known catalysts such as tertiary amines, organometallic compounds, organic acid salts, inorganic salts, etc. may be used for the reaction.

Proportion of the isocyanate component to the blocking agent to be reacted is such that the number of free isocyanate group/the number of active hydrogen in the blocking agent is about 0.95 to 1.0.

In this way the compound (1) is obtained.

As the polyol (2) used in this invention, mention may be made of a compound containing at least two active hydrogens and having a molecular weight of 400 to 50,000. Use of a polyol having a molecular weight of less than 400 produces a coating inferior in chemical resistance. While, use of a polyol having a molecular weight of more than 50,000 provides poor workability in coating and does not give smooth coating. Preferred is a polyol having 2 to 50 of hydroxyl groups in one molecule and having a molecular weight of 400 to 50,000. More preferred is a polyol having 2 to 50 of hydroxyl groups in one molecule and having a molecular weight of 500 to 30,000. When an isocyanate component having 1 to 2 of oxadiazinetrione rings in one molecule is used, the polyol component to be used is preferably one having 2 to 4 of hydroxyl groups in one molecular and a molecular weight of 400 to 30,000. The compound may be the one having active hydrogen such as carboxyl group, amino group, thiol group, etc. in addition to hydroxyl groups. Specifically, there may be suitably used polyester polyols, polyether polyols, polyetherester polyols, polyester-amide polyols, acrylic polyols, polyurethane polyol, epoxy polyols, epoxy-modified polyols, polyhydroxyalkanes, oil-modified polyols, castor oil or mixtures thereof.

Examples of said polyester polyols are reaction products of polyhydric alcohols and polybasic acids. As the polyhydric alcohols, mention may be made of ethylene glycol, propylene glycol, butylene glycol, hexylene glycol, neopentyl glycol, cyclohexanedimethanol, diethylene glycol, triethylene glycol, polyethylene glycol, dipropylene glycol, polyoxypropylene glycol, polyoxybutylene glycol, glycerol, trimethylolpropane, pentaerythritol, sorbitol, etc. As the polybasic acids, mention may be made of succinic acid, adipic acid, azelaic acid, sebacic acid, phthalic acid, isophthalic acid, terephthalic acid, tetrahydrophthalic acid, hexahydrophthalic acid, maleic acid, fumaric acid and anhydrides thereof, etc. Further suitable examples are polyester polyols obtained by ring opening polymerization of lactones such as caprolactone, methylcaprolactone, etc. with glycols, etc. There can also be used oil-modified polyols. Such polyols can be obtained by modifying said polyester polyols with fatty acids such as coconut, cotton seed and safflower fatty acid.

Examples of the polyether polyols are those which are obtained by polymerization of epoxide compounds such as ethylene oxide, propylene oxide, butylene oxide, tetrahydrofuran, styrene oxide, epichlorohydrin, phenylglycidyl ether, allylglycidyl ether, etc. in the presence of a catalyst such as boron trifluoride or by addition of these epoxide compounds along or as a mixture or alternately to reactive hydrogen atom containing initiators. As the reactive hydrogen atom-containing initiators, mention may be made of water, polyols such as ethylene glycol, propylene glycol, glycerol, trimethylolpropane, pentaerythritol, sorbitol, etc., amino alcohols such as ethanol amine, polyamines such as ethylenediamine, etc.

As examples of the polyether-ester polyols, mention may be made of those which are obtained by subjecting said polyether polyols and polybasic acids to polyesterification reaction and besides those which have both the segments of polyether and polyester in one molecule and which are obtained by ring-opening copolymerization of epoxide compounds and acid anhydrides.

Examples of the polyester-amide polyols are those which are obtained by said polyesterification reaction where amino group-containing starting material such as ethylenediamine, propylenediamine, hexamethylenediamine, xylylenediamine, hydrogenated xylylenediamine, ethanolamine, propanolamine, etc. are additionally used.

The hydroxyl group-containing polymers generally called acrylic polyols can be prepared by copolymerizing polymerizable monomers containing at least one hydroxyl group in one molecule with other monomers copolymerizable with said monomers. As the hydroxyl group-containing monomers, mention may be made of hydroxyethyl acrylate, hydroxypropyl acrylate, hydroxybutyl acrylate, trimethylolpropane monoacrylate, their corresponding methacrylic acid derivatives, polyhydroxyalkyl maleate and fumarates, etc. As examples of the copolymerizable monomers, mention may be made of, for example, acrylic acid, its methyl, ethyl, propyl, butyl, 2-ethylhexyl esters, methacrylic acid, maleic acid, fumaric acid, itaconic acid and their esters as enumerated above, and vinyl monomers such as styrene, α-methylstyrene, vinyl acetate, acrylonitrile, methacrylonitrile, etc.

As examples of polyurethane polyols, mention may be made of reaction products of polyols and polyisocyanates which have terminal hydroxyl group. Examples of the polyols are polyols such as ethylene glycol, propylene glycol, butylene glycol, hexylene glycol, neopentyl glycol, cyclohexanedimethanol, diethylene glycol, triethylene glycol, dipropylene glycol, glycerol, trimethylolpropane, pentaerythritol, sorbitol, etc. or polymer polyols such as polyester polyol, polyether polyol, polyester ether polyol, polyester amide polyols, etc. As the polyisocyanates, mention may be made of polyisocyanates such as tetramethylene diisocyanate, hexamethylene diisocyanate, 2,6-diisocyanatomethylcaproate, 3-isocyanatomethyl-3,5,5-trimethylcyclohexyl isocyanate, 4,4'-methylenebis(cyclohexyl isocyanate), 1,3-1,4-bis(isocyanatomethyl)cyclohexane, methylcyclohexane-2,4-diisocyanate, m- or p-phenylene diisocyanate, diphenylmethane-4,4'-diisocyanate, 2,4- or 2,6-tolylene diisocyanate, 1,3- or 1,4-xylylene diisocyanate or dimers, trimers, etc. of these polyisocyanates. Furthermore, reaction products of said polyisocyanates with said polyols a part of which is substituted with an amino compound such as ethylenediamine, propylenediamine, hexamethylenediamine, xylylenediamine, bisaminomethylcyclohexane, 3-aminomethyl-3,5,5-trimethylcyclohexylamine, ethanolamine, propanolamine, etc. may also be used as the polyurethane polyols.

Examples of the epoxypolyols are epoxy resins obtained by condensation reaction of a polyphenol compound or its ring hydrogenated product with epichlorohydrin. Besides these resins, epoxy ester resins obtained by reacting a fatty acid with an epoxy resin or modified epoxy resins obtained by reacting an alkanolamine with an epoxy resin may also be used.

Examples of the polyhydroxyalkanes are hydrolyzed products of vinyl acetate homopolymers or copolymer of vinyl acetate with other ethylenic copolymerizable monomers and polybutadiene polyols.

Not only the hydroxyl group-containing compounds of relatively high molecular weight mentioned hereinabove, but low molecular weight polyols having a molecular weight of about 62 to 400 may be used as mixtures. As these low molecular weight polyols, mention may be made of ethylene glycol, propylene glycol, buthylene glycol, hexylene glycol, neopentyl glycol, cyclohexanedimethanol, glycerol, trimethylolpropane, pentaerythritol, diethylene glycol, triethylene glycol, dipropylene glycol, etc.

The proportion of the compound (1) having at least one NCO group blocked with an alcohol, lactam or oxime blocking agent and oxadiazine-2,4,6-trione ring to the polyol (2) is such that the ratio of the total number of the oxidiazinetrione ring and the blocked isocyanate group to the number of active hydrogen of the polyol is in a range of 0.1 to 10, preferably 0.3 to 3, more preferably 0.5 to 2.0. When the above ratio is less than 0.1, the coating has insufficient strength and poor chemical resistance. When the ratio exceeds 10, there is only obtained the hard and brittle coating.

Thus obtained composition of this invention is generally used as one-pack type composition and the composition as it is or as a solution is applied to the surface to be coated and is cured by baking. At the time of actual use, there may be added known catalysts such as tertiary amines, tertiary phosphines, organo metallic compounds, organic acid salts, inorganic salts, etc. for acceleration of the reaction of oxadiazinetrione ring with OH group. Furthermore, if necessary, there may be optionally used, e.g., pigments, dyes, leveling agents, antifoamers, anti-sag agents, etc.

The composition of this invention is useful for coating of metals such as iron, aluminum, etc., woods, plastics, rubbers, roofing tiles, concretes, etc. The composition of this invention requires the blocking agent in an amount much smaller than the conventional block type polyisocyanates and besides, it has a baking temperature 30° to 50° C. lower than that of the conventional urethane coatings and besides has a good storage stability. Furthermore, the coating obtained by baking the composition of this invention at about 100° to 150° C. for about 1 to 30 minutes has no problems of yellowing and pin-holes and is excellent in mechanical properties, chemical resistance and weather resistance. It is especially good in the balance of hardness and flexibility and is suitable for production of precoat metals.

The following examples will further illustrate this invention.

REFERENCE EXAMPLE 1

To 971 g of 1,3-bis(isocyanatomethyl)cyclohexane was added 3.0 g of tri-n-butylphosphine while introducing carbon dioxide thereinto at 10° C. and the reaction was carried out for 5 hours under stirring. Then, carbon dioxide was replaced with nitrogen and 3.8 g of benzoyl peroxide was added to the reaction product and the product was stirred for 80 minutes. Starting materials were removed from the product by evaporation with a film evaporator to obtain 280 g of viscous liquid of pale yellow. This product had an NCO content of 4.35 meq/g, an oxadiazinetrione content of 2.22 meq/g and a residual monomer content of 0.8%.

REFERENCE EXAMPLE 2

To 841 g of hexamethylene diisocyanate was added 1.8 g of tri-n-butylphosphine, while introducing carbon dioxide thereinto at 40° C. and the reaction was carried out for 6 hours while stirring. Feeding of carbon dioxide was discontinued and 0.3 g of sulfur powder was added to the reaction product. The product was stirred for 30 minutes and then cooled. Starting materials were removed therefrom with a film evaporator to obtain 255 g of a somewhat viscous liquid of pale yellow. This product had an NCO content of 4.78 meq/g, oxadiazinetrione content of 2.77 meq/g and a residual monomer content of 0.4% and had a viscosity (Gardner) of Y-Z (2,000 cps) at 25° C.

REFERENCE EXAMPLE 3

While introducing carbon dioxide into 94 g of metaxylylene diisocyanate and 0.2 g of tri-n-butylphosphine at a rate of 300 ml/min at 5° C., the reaction was carried out for 8 hours and the reaction was terminated by the addition of 1.0 g dimethyl sulfate to obtain a polyisocyanate having an oxadiazine-2,4,6-trione content of 1.9 meq/g and an NCO content of 5.43 meq/g.

EXAMPLE 1

152 g of polyisocyanate obtained in Reference Example 1 was dissolved in 150 g of cyclohexanone. To the solution were added 66 g of triethylene glycol and 0.02 g of 1,3-diacetoxytetrabutyldistannoxane and the reaction was carried out at 60° C. for 3 hours. Furthermore, 11 g of ethanol was added to the reaction product and reaction was further carried out at 60° C. for 5 hours to find that there was no NCO group. The mixture of this reaction product with 475 g of an acrylic polyol (prepared from styrene, methyl methacrylate, hydroxyethyl acrylate, ethyl acrylate and butyl acrylate; OH value: 40 and non-volatile matter: 50%) was stable for more than 3 months at room temperature. To each 100 g of the mixture was added the compound shown in Table 1, followed by mixing. The mixture was coated on a mild steel panel and heated for 20 minutes. The temperature at which solvent resistance of the coating film tested by rubbing with ethyl acetate was developed is shown in Table 1.

TABLE 1

| Additives | Lead octylate | Zinc naphthenate | 1,5-diazabicyclo [5,4,0]-5-undecene formate |
|---|---|---|---|
| Amount (mg) | 150 | 200 | 20 |
| Curing temperature | 120 | 130 | 110 |

TABLE 1-continued

| Additives (°C.) | Lead octylate | Zinc naphthenate | 1,5-diazabicyclo [5,4,0]-5-undecene formate |
|---|---|---|---|

EXAMPLE 2

230 g of the polyisocyanate obtained in Reference Example 1 was dissolved in 211.4 g of 2-ethoxyethyl acetate. To the solution was gradually added 87.1 g of methyl ethyl ketoxime in such a manner that the temperature of the reaction mixture was kept at 60° to 65° C. After completion of the addition of the methyl ethyl ketoxime, the solution was further heated to 60° to 65° C. for one hour to find that no NCO groups were recognized. The mixture of this reaction product with 1720 g of an acrylic polyol (prepared from styrene, butyl acrylate and 2-hydroxyethyl methacrylate; OH value: 50 and non-volatile matter: 50%) was stable for more than 3 months at room temperature. This mixture was coated on a cold-rolled steel panel and heated at 120° C. for 20 minutes to obtain a tough coating film. Properties of the film are shown in Table 2.

EXAMPLE 3

230 g of the polyisocyanate obtained in Reference Example 1 was dissolved in 228.8 g of 2-ethoxyethyl acetate. To the solution was added 0.07 g of dibutyltin dilaurate and then was further added 113.2 g of ε-caprolactam. The mixture was heated to 75° to 85° C. for 6 hours to result in complete disappearance of NCO group. To the reaction product were added 610 g of polyester polyol Takelac ®U-25 (non-volatile matter: 75%; OH value: 141; manufactured by Takeda Chemical Industries, Ltd.) and 4 g of tetrabutyl-1,3-diacetoxydistannoxane, followed by mixing. This mixture was stable for more than 3 months at room temperature. This mixture was coated on a cold-rolled steel panel and heated at 110° C. for 20 minutes to obtain a tough coating film. Properties of the coating film are shown in Table 2.

TABLE 2

| Test items | Example 2 | Example 3 |
|---|---|---|
| Pencil scratch test | 3H | 2H |
| Cross hatch adhesion | 100/100 | 100/100 |
| Mandrel bending resistance test (mm) | 2 | 2 |
| Erichsen test (mm) | 8 | 8 |
| Impact test (½ inch, g × cm) | 1000 × 30 | 1000 × 50 |
| Solvent resistance[1] | Good | Good |
| Weather resistance[2] | No change | No change |

[1]Rubbing test with ethyl acetate
[2]By Dew Cycle Weatherometer for 200 hours

EXAMPLE 4

209.2 g of the polyisocyanate obtained in Reference Example 2 was dissolved in 197.5 g of 2-ethoxyethyl acetate. To this solution was carefully dropped 87.1 g of methyl ethyl ketoxime and the reaction was further carried out at 60° to 65° C. for one hour to find that NCO groups disappeared.

312.5 g of this reaction product was mixed with 344 g of a polyurethane polyol (OH value: 81.5; and non-volatile matter: 60%) comprising phthalic anhydride, trimethylolpropane, diethylene glycol and bis-(isocyanatomethyl)cyclohexane. This mixture was stable for more than 3 months. Furthermore, this mixture was coated on a cold-rolled steel panel and was heated at 120° C. for 20 minutes to obtain a tough coating. Properties of this coating are shown in Table 3.

EXAMPLE 5

625 g of the same polyisocyanate as used in Example 4 was mixed with 781.3 g of an epoxy resin (Epikote ®1009 (having a hydroxyl equivalent of 781 and a non-volatile matter of 40% and manufactured by Shell International Chemicals Corp.) dissolved in butylcarbitol. The mixture was coated on a cold-rolled steel panel and was heated at 120° C. for 20 minutes to obtain a tough coating. Properties of the coating are shown in Table 3. This mixture was stable for more than 3 months.

TABLE 3

| Test items | Example 4 | Example 5 |
|---|---|---|
| Pencil scratch test | H | 3H |
| Cross hatch adhesion | 100/100 | 100/100 |
| Mandrel bending resistance test (mm) | 2 | 2 |
| Erichsen test (mm) | 8 | 7.5 |
| Impact test (½ inch, g × cm) | 1000 × 50 | 500 × 50 |
| Solvent resistance[1] | Good | Good |
| Weather resistance[2] | No change | No change |

[1],[2]; Same as in Table 2.

We claim:

1. A thermosetting polyurethane coating composition of one-pack type which comprises (1) a compound having at least one NCO group blocked with an alcohol, lactam or oxime blocking agent and at least one oxadiazine-2,4,6-trione ring and (2) a polyol having a molecular weight of 400 to 50,000; said compound (1) being one prepared by the reaction of an isocyanate compound having at least one oxadiazine-2,4,6-trione ring and at least one free NCO group with an alcohol, lactam or oxime blocking agent.

2. A thermosetting polyurethane coating composition according to claim 1, wherein the isocyanate compound is the one prepared by the reaction of an aliphatic, alicyclic or aromatic-aliphatic polyisocyanate with carbon dioxide.

3. A thermosetting polyurethane coating composition according to claim 2, wherein the isocyanate compound is the one prepared by the reaction of hexamethylene diisocyanate, xylylene diisocyanate or bis-(isocyanatomethyl)cyclohexane with carbon dioxide.

4. A thermosetting polyurethane coating composition according to claim 1, wherein the polyol is a polyol having 2 to 50 hydroxyl groups in one molecule and having a molecular weight of 500 to 30,000.

5. A thermosetting polyurethane coating composition according to claim 4, wherein the polyol is polyester polyol, acrylic polyol, polyurethane polyol or epoxy polyol.

6. A thermosetting polyurethane coating composition according to claim 1, wherein the proportion of the isocyanate component to the blocking agent to be reacted is such that the number of free isocyanate group/the number of active hydrogen group in the blocking agent is about 0.95 to 1.0.

7. A thermosetting polyurethane coating composition according to claim 1, wherein the proportion of the isocyanate component (1) to the polyol (2) is such that the ratio of the total number of the oxadiazinetrione ring and the blocked isocyanate group to the number of active hydrogen of the polyol is in a range of 0.1 to 10.

8. A coating method which comprises coating on a surface to be coated a composition which comprises (1) a compound having at least one NCO group blocked with an alcohol, lactam or oxime blocking agent and at least one oxadiazine-2,4,6-trione ring and (2) a polyol having a molecular weight of 400 to 50,000; said compound (1) being one prepared by the reaction of an isocyanate compound having at least one oxadiazine-2,4,6-trione ring and at least one free NCO group with an alcohol, lactam or oxime blocking agent and baking the coated composition at about 100° to 150° C. for about 1 to 30 minutes.

9. A thermosetting polyurethane coating composition according to claim 1, wherein the alcohol blocking agent is ethanol.

10. A thermosetting polyurethane coating composition according to claim 1, wherein the lactam blocking agent is ε-caprolactam.

11. A thermosetting polyurethane coating composition according to claim 1, wherein the oxime blocking agent is methyl ethyl ketoxime.

12. A coating method according to claim 8, wherein the isocyanate compound is the one prepared by the reaction of an aliphatic, alicyclic or aromatic-aliphatic polyisocyanate with carbon dioxide.

13. A coating method according to claim 12, wherein the isocyanate compound is the one prepared by the reaction of hexamethylene diisocyanate, xylylene diisocyanate or bis(isocyanato-methyl)cyclohexane with carbon dioxide.

14. A coating method according to claim 8, wherein the polyol is a polyol having 2 to 50 hydroxyl groups in one molecule and having a molecular weight of 500 to 30,000.

15. A coating method according to claim 14, wherein the polyol is polyester polyol, acrylic polyol, polyurethane polyol or epoxy polyol.

16. A coating method according to claim 8, wherein the proportion of the isocyanate component to the blocking agent to be reacted is such that the number of free isocyanate group/the number of active hydrogen group in the blocking agent is about 0.95 to 1.0.

17. A coating method according to claim 8, wherein the proportion of the isocyanate component (1) to the polyol (2) is such that the ratio of the total number of the oxadiazinetrione ring and the blocked isocyanate group to the number of active hydrogen of the polyol is in a range of 0.1 to 10.

18. A coating method according to claim 8, wherein the alcohol blocking agent is ethanol.

19. A coating method according to claim 8, wherein the lactam blocking agent is ε-caprolactam.

20. A coating method according to claim 8, wherein the oxime blocking agent is methyl ethyl ketoxime.

* * * * *